United States Patent [19]
Sealander et al.

[11] Patent Number: 6,069,911
[45] Date of Patent: *May 30, 2000

[54] RADIO NETWORK INITIALIZATION METHOD AND APPARATUS

[75] Inventors: Wanda Sealander, San Jose, Calif.; John W. Kramer, Allison Park, Pa.

[73] Assignee: Symbol Technologies, Holtsville, N.Y.

[ * ] Notice: This patent is subject to a terminal disclaimer.

[21] Appl. No.: 09/038,195

[22] Filed: Mar. 10, 1998

Related U.S. Application Data

[62] Division of application No. 08/444,168, May 18, 1995, which is a continuation of application No. 07/904,933, Jun. 26, 1992, Pat. No. 5,418,812.

[51] Int. Cl.[7] .................................................... A61F 2/06
[52] U.S. Cl. ........................ 375/130; 375/140; 375/146; 379/910
[58] Field of Search ..................................... 375/130, 259, 375/295, 316, 140, 145, 146, 147, 149; 370/457, 453; 379/910; 235/439

[56] References Cited

U.S. PATENT DOCUMENTS

| | | | |
|---|---|---|---|
| 4,932,037 | 6/1990 | Simpson et al. | 375/200 |
| 4,995,053 | 2/1991 | Simpson et al. | 375/200 |
| 5,029,183 | 7/1991 | Tymes | 375/200 |
| 5,046,066 | 9/1991 | Messenger | 370/200 |
| 5,103,461 | 4/1992 | Tymes | 375/200 |
| 5,280,498 | 1/1994 | Tymes et al. | 375/200 |
| 5,418,812 | 5/1995 | Reyes et al. | 375/200 |
| 5,479,441 | 12/1995 | Tymes | 375/200 |

OTHER PUBLICATIONS

Digital Communications and Spread Spectrum Systems by Rodger E. Ziemer Copyright 1985 Macmillan Publishing Company, pp. 366–385.

*Primary Examiner*—Stephen Chin
*Assistant Examiner*—Albert Park

[57] ABSTRACT

A packet data transmission system is disclosed in which remote units, such as remote hand-held data gathering units, which normally communicate with remote base stations via a spread spectrum RF communications, are initialized via spread spectrum RF communications. A network chipping sequence is provided for encoding normal communications and an universal chipping sequence is provided for encoding communications relating to initialization of the remote units. The network chipping sequence is adjustable and must be initialized in each of the remote units to enable normal communications. The universal chipping code is fixed for all remote devices and base stations. Since the universal chipping code is fixed, spread spectrum RF communications of the initialization data, using the universal chipping code, can be effected even if the network chipping sequence is not initially set in the remote units. The initialization data communicated to the remote includes the network chipping code which is then stored in the remote units and used for subsequent normal communications.

3 Claims, 8 Drawing Sheets

RADIO NETWORK INITIALIZATION METHOD AND APPARATUS

This application is a divisional-of a U.S. application Ser. No. 08/444,168 filed on May 18, 1995, which is a continuation of U.S. application Ser. No. 07/904,933 filed on Jun. 26, 1992 and issued as U.S. Pat. No. 5,418,812.

This invention relates to data communication systems, and more particularly to a spread spectrum RF packet communication system in which initialization information is communicated via a spread spectrum RF link from a central computer to remote units.

BACKGROUND OF THE INVENTION

In retail or commercial facilities, radio frequency (RF) networks are used to communicate information between remote devices, such as bar code readers and data terminals, and a central computer. In commonly assigned U.S. Pat. No. 5,029,183, for "Packet Data Communication Network", which is hereby incorporated by reference, a data communications network includes a number of remote devices, and a spread spectrum RF link for sending packetized data to a host computer and for receiving an acknowledge signal and data from the host computer.

To permit a remote device to communicate on a selected spread spectrum data communication network, it is required that the remote devices obtain and store information relating to parameters of the spread spectrum radio RF link for that particular network. The parameters which are required to permit communications include the frequency of operation and the pseudo-random chipping sequence of the selected spread spectrum network. Further, a new remote device often obtains and stores various network configuration information, such as, for example, what other equipment is available on the network, the identity of other network members, and its own identity in the network.

In U.S. Pat. No. 5,029,183, an initialization procedure is described, in which, each remote device has an RS-232 connector which is temporarily coupled to the host computer. The pseudo-random chipping sequence and the operating frequency of the particularly spread spectrum network, and various other network information, are communicated, via the temporary RS-232 link, from the host computer to the remote device. The remote device then stores the received information in non-volatile memory. After the initialization procedure, the RS-232 connector is uncoupled from the host computer, and subsequent communications between the remote device and the host computer are made by way of the spread spectrum RF link, utilizing the chipping sequence and the operating frequency stored in the non-volatile memory of the remote device.

After remote devices have been initialized, it is often desired to change the chipping sequence of the network for security or other reasons. For example, the chipping sequences for each network can be made directly and uniquely dependent on the host computer's serial number. If the host computer is replaced, it is required to re-initialize the chipping sequence in each remote device so as to conform to the new unique chipping number of the network. In the 5,029,183 Patent, this re-initialization requires that the RS-232 connection between the remote device and the host computer be used.

In a typical retail or commercial facility utilizing a spread spectrum RF network, it is possible that the remote devices are widely distributed and/or that the remote devices are incorporated in large, non-movable devices. Accordingly, it is often difficult to connect each remote device, via a RS-232 link, to the host the computer to accomplish the above-described initialization and/or re-initialization procedure of the remote device.

To facilitate a periodic RS-232 connection between portable, rechargeable type remote devices and the host computer, it is known to build a RS-232 connection into a charging cradle (herein after referred to as a charging/communicating module). When the remote device is placed in the charging/communication module to be recharged, the RS-232 link is established between the remote device and the host computer, and appropriate initialization and/or re-initialization communications can be effected via the RS-232 link. However, it is known that the portable remote devices may not be placed in the charging/communicating module for long periods of time, and therefore, the re-initialization of the remote device is delayed. Further, during initialization, it is often inconvenient, due to physical layout of the facility, to place each portable device in a charging/communication module, to effect initialization. Still further, the charging/communication module can not be used for remote devices that are incorporated into devices that are not easily portable.

As can be appreciated, as an alternative to connecting the remote device via RS-232 to the host computer, it would be desirable to initialize and/or re-initialize a remote device via the spread spectrum RF link that is used during normal operation. However, to communicate over the spread spectrum link, the remote device must first know the pseudo-random chipping sequence for that particular link. Without knowledge of the pseudo-random chipping sequence, the remote device can not properly interpret received data.

It is theoretically possible for a non-initialized remote device to obtain initialization information, via the spread spectrum RF link, from the host computer, by sequentially cycling through every possible pseudo-random chipping sequence for each possible operating frequency. When the correct combination of pseudo-random chipping sequence and operating frequency is reached, the spread spectrum RF link between the host computer and the remote device channel is established, and the relevant initialization data can be transmitted. However, this approach is impractical due to the large number of possible pseudo-random chipping sequences available in a typical spread spectrum RF data communication network. An inordinate amount of time and energy would be required to accomplish the initialization of each remote device in this manner.

SUMMARY OF THE INVENTION

It is an object of the present invention to provide a spread spectrum RF data communication network which overcomes the above described problems of the prior art.

It is a further object of the present invention to provide a spread spectrum RF data communications network in which initialization information can be transmitted from a host computer, via a spread spectrum RF link, to remote devices.

In accordance with one embodiment of the present invention, a packet data communication system includes a number of remote units for gathering data. Each remote unit is arranged to normally communicate with a base station by way of a spread spectrum RF link where the data is encoded by a network chipping code. The network chipping code is selectable and must be initialized so as to correspond to the network chipping code for the particular network in which the remote units are to function before normal communications can be effected. To facilitate initialization of the remote units, each remote unit is arranged to request and receive initialization data including information on the network chipping code, by way of a spread spectrum RF link where the initialization request and the initialization data is encoded by a universal chipping code. The universal chipping code is factory preset in each remote unit and each base station to a predetermined value. In this manner, communications of the initialization data can be effected regardless of the value of the network chipping code.

In an illustrative embodiment, a remote unit requests initialization data from the base station by transmitting, via the spread spectrum RF link, a data packet encoded by the universal chipping code. The base station, responsive to receiving and decoding the data packet, transmits via the spread spectrum RF link an initialization data packet which is encoded by the second chipping code. The initialization data packet includes information identifying the network chipping code for the particular network. The remote unit receives and decodes the initialization data packet and stores the network chipping code in internal memory for use in encoding and decoding subsequent normal transmissions.

In a preferred embodiment, the remote units includes memory and a CPU, where all data to be transmitted by the remote unit via the spread spectrum link is stored in the memory and encode by the CPU. The normal communications are encode by the network chipping code and initialization requests are encoded by the universal chipping code. All data received at the remote unit via the spread spectrum link is also stored in the memory and is decoded by the CPU, using the network chipping code and the universal chipping code. A particular advantage of this type of arrangement is that standard remote terminals (i.e., terminals which previously only utilized the network chipping code) can be utilized without hardware modification by changing the operation sequence of the CPU.

In an embodiment of the present invention, each transmission includes a start-symbol. The base station includes memory and a CPU, where all data, including the start-symbol, to be transmitted by the bass station via the spread spectrum link is stored in the memory and encode by the CPU. The normal communications are encoded by the network chipping code and initialization requests are encoded by the universal chipping code. The base station further includes first and second shift registers for storing the portions of the transmissions corresponding to the start-symbol which are received by the base stations. First and second decoders, are arranged to decode the contents of the first and second shift registers, respectively, and to determine when a start-symbol is received and whether the received start-symbol has been encoded by the network chipping code or the universal chipping code. After detection of the start-symbol, the remainder of the received transmission is stored in memory where it is then decoded by the CPU using the appropriate chipping code.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

DETAILED DESCRIPTION OF A SPECIFIC EMBODIMENT

A number of specific embodiments of the invention are described herein. It will be understood that these embodiments are presented for the purpose of illustration and not as limiting the scope of the invention.

Figure 1:
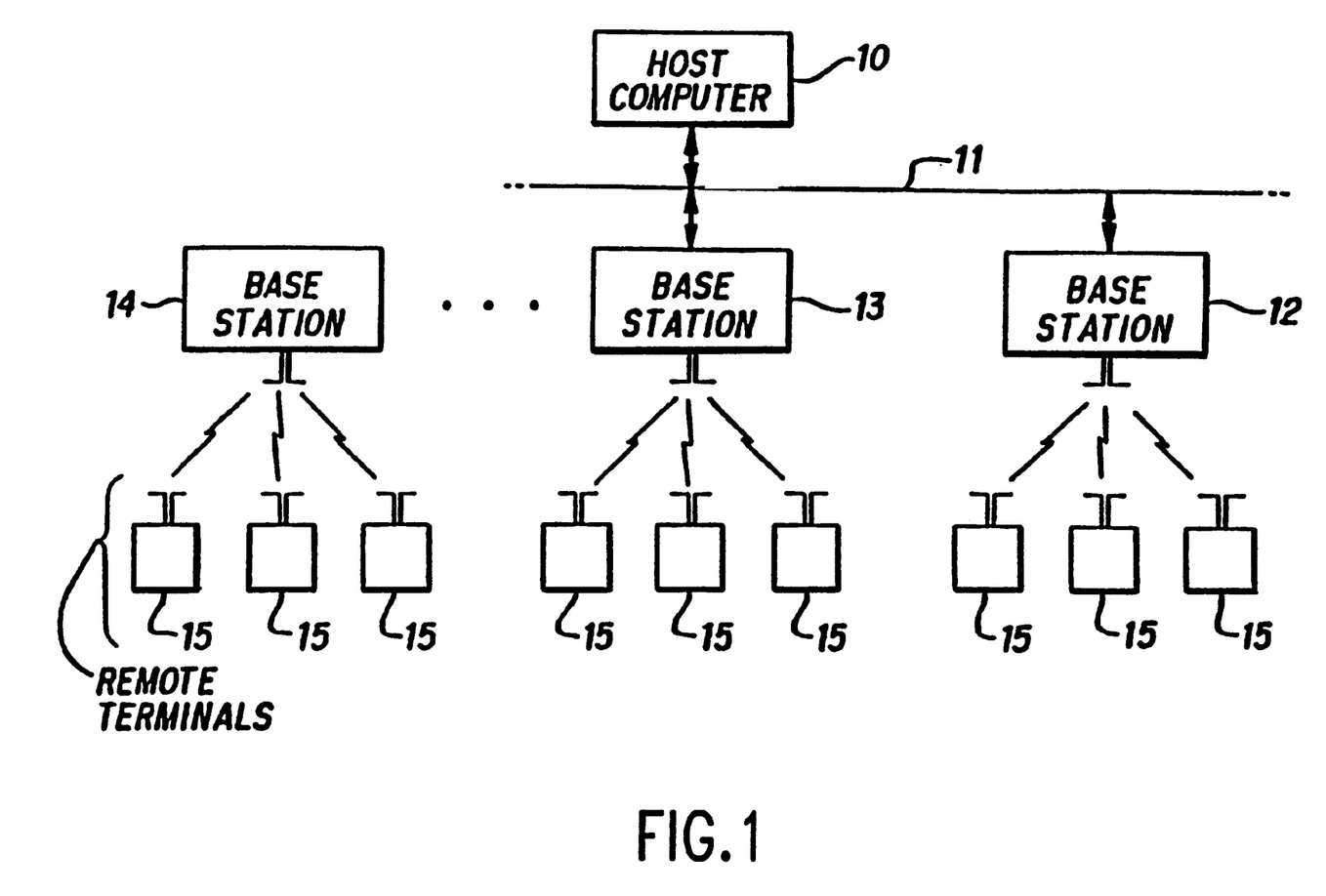
FIG. 1 is an electrical diagram in block form of a packet data communication system.

Referring to FIG. 1, a data communications network is illustrated. The network of FIG. 1 is described in more detail in commonly assigned U.S. Pat. No. 5,029,183 for "Packet Data Communication Network", which is herein incorporated by reference. A host computer 10 is connected by a communications link 11 to a number of base stations 12 and 13; other base stations 14 can be coupled to the host through the base stations 12 or 13 by an RF link. Each one of the base stations 12, 13 or 14 is coupled by a spread spectrum RF link to a number of remote units 15.

In one embodiment, the remote units 15 are laser-scan bar-code readers of the hand-held, battery-operated type as disclosed in U.S. Pat. Nos. 4,387,297, 4,409,470 or 4,760, 248, all assigned to Symbol Technologies, Inc., for example. Various other types of remote terminals may be advantageously employed in a system having features of the invention; these-remote terminals ordinarily would include data entry facilities such as a keyboard or the like, as well as a display (or printer) for indicating to a user information detected, transmitted and/or received by this terminal 15.

Although hand-held, laser-scan type bar-code readers are mentioned, the data terminals 15 may also be bar-code readers of the wand type, and may be stationary rather than hand-held. For example, the stationary device may be a computer or point of sale terminal having plug-in or integral circuitry for effecting the communications. The device may be of the optical character recognition (OCR) type, as well.

Figure 2:
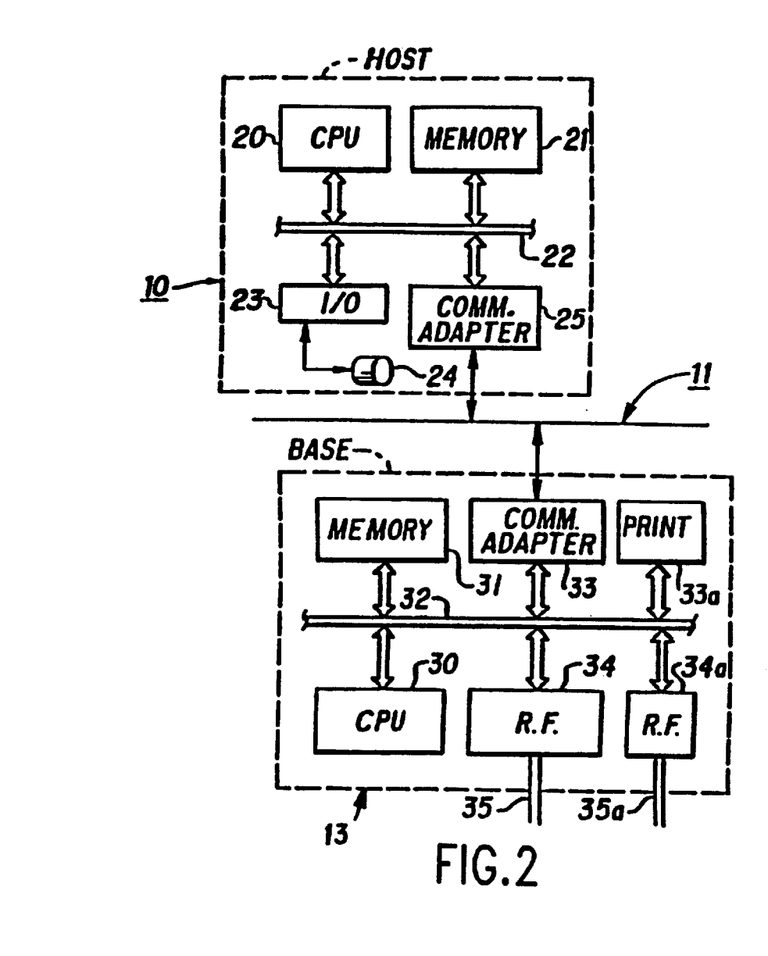
FIG. 2 is a more detailed electrical schematic diagram in block form of the host computer and one of the base stations in the system of FIG. 1.

Referring to FIG. 2, in a typical commercial or retail application of a network of FIG. 1, the host computer 10 maintains a database management system (employing suitable database management software similar to that commercially available) to which the remote units 15 make entries or inquiries via the base stations 12, 13 and 14.

The host computer 10 has a CPU 20 which accesses a memory 21 via a main bus 22 to execute instructions. Various I/O processors 23 are used to access peripherals such as keyboard, video display, etc., as well as disk storage 24 for the database system and other computer functions. A communications adapter 25 couples the CPU 20 via main bus 22 to the link 11. This communications link 11 may be of the serial type such as RS-232, or in a system designed for higher performance the link 11 may use one of the available local area network type of protocols such as Ethernet or token ring.

The base stations 12, 13 and 14 each utilize a CPU 30 which accesses a memory 31 via local bus 32, also seen in FIG. 2. This data processing unit is coupled to the serial link 11 via a communications adapter 33. An RF transceiver 34 is coupled to the CPU 30 in each base station via the local bus 32 and is connected to an antenna 35 for RF transmission to and reception from the remote units 15. The memory 31 includes ROM or EPROM for start-up code executed by the CPU 30, as well as fast RAM for the program executed during normal operations and for buffering the digital data incoming from or outgoing to the RF transceiver 34.

Figure 3:
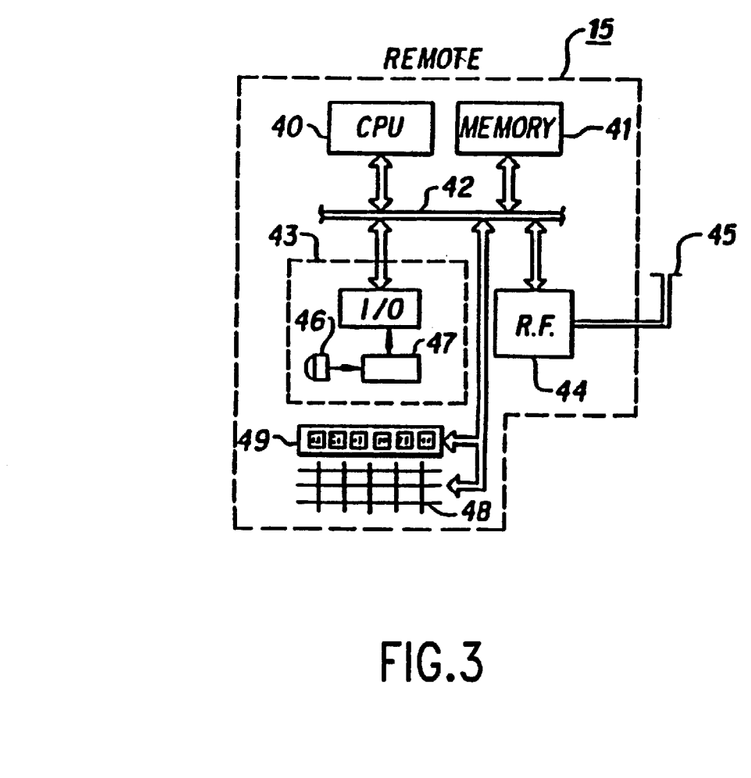
FIG. 3 is a more detailed electrical schematic diagram in block form of one of the remote units in the system of FIG. 1.

Referring to FIG. 3, each remote unit 15 in the example embodiment is a data terminal (e.g., a hand-held bar code reader) having a CPU 40 executing instructions from a program and data memory 41 which is coupled to the CPU via a local bus 42. A peripheral bar code data acquisition device 43 is coupled to the CPU via the bus 42 and used to detect and/or convert data from the bar code scanning section to be stored in the memory 41 and processed by the CPU 40; other control devices interface with the keyboard and display. An RF transceiver 44 is coupled to and controlled by the CPU via the bus 42, and transmits coded RF signals through an antenna 45 or detects and converts RF signals received by the antenna, according to a protocol. In the example of the remote unit 15 being a laser-scan bar-code reader, the device 43 is used to input data from a photodetector device 46 which produces a serial electrical signal fed to a code recognition circuit 47 responding to the characteristic patterns of bar code symbols and providing bar code data to the memory 41 via device 43 when a bar code is scanned. The CPU 40 within the remote unit checks the bar code data for validity and format, by executing code stored in the memory 41, and, when the data packet has been prepared in the memory 41, the CPU initiates an RF transmission by activating the RF transceiver 44 and transferring the encoded packet containing the bar code data to the transceiver via bus 42. Usually the remote unit has a manual data entry device such as a keyboard 48, and a visual display 49 such as an LCD device.

The RF transmission method used for communication between remote units 15 and base stations 12, 13 and 14, utilizes the spread spectrum RF modulation technique, i.e., the transmitted signal is spread over a wide frequency band, much wider than the bandwidth required to send the digital information. Reference is made to U.S. Pat. No. 5,029,183 for details of design, construction, operation and communication protocols of this type of spread spectrum RF equipment. More particularly, U.S. Pat. No. 5,029,183 describes a system in which a single pseudo-random binary code (also referred to as the "chipping code") is combined (i.e., exclusive-ORed) with all messages to be communicated between the remote units 15 and the base stations 12, 13 and 14. The pseudo-random binary code is chosen to be unique for each network to avoid crosstalk with other networks operating in overlapping areas.

In accordance with the principles of the present invention, each remote unit 15 and each of the base stations 12, 13 and 14 is arranged to use two different pseudo-random chipping codes. These two different chipping codes permit two different data streams to be shared on a single RF channel. Further, each of the remote units 15 is assigned an unique serial number which is incorporated in the communication packets sent from the remote units 15 to the base stations 12, 13 and 14.

In a specific embodiment, the first of the pseudo-random chipping codes in each of the remote units 15 and each of the base stations 12, 13 and 14 is set to a predetermined universal default value (referred hereinafter as the "universal chipping code"). The universal chipping code may be preset during manufacture by storing the value in non-volatile memory (i.e., EEPROM, ROM, PROM, etc.) or by a hardware configuration (i.e., switch settings, PCB layout, etc.) The universal chipping code is used by the remote units 15 to request and receive initialization and/or re-initialization information from the base stations 12, 13 and 14. The second of the pseudo-random chipping codes (referred hereinafter as the "network chipping code") can be set to a unique value for each network to prevent cross-talk between overlapping networks. The network chipping code is used by the remote units 15 and the base stations 12, 13 and 14 of the network to effect normal communications (i.e., communication of information other than initialization and re-initialization information.) U.S. Pat. No. 5,029,183 describes such normal communications in greater detail.

Prior to initialization, a remote unit 15 contains the universal chipping code but does not contain a network chipping code that coincides with the network chipping code allocated to the particular network to which the remote unit is to be added. Since the base stations 12, 13 and 14 of the network each contain the same universal chipping code as the remote unit 15, communication can be established between the remote station 15 and the base stations 12, 13 and 14 provided that the correct RF frequency is utilized. A remote unit 15, in need of either initialization or re-initialization, utilizes the universal chipping code to transmit an initialization request, which includes the remote unit's 15 serial number, while at the same time cycling through the limited number of RF frequencies available for the network.

The base units 12, 13 and 14, using the universal chipping code stored therein, receive and decode the initialization request transmitted by the remote unit when the cycling of the RF frequency causes the frequency of the transmission to correspond to the frequency that the base station is currently configured receive. Responsive to the initialization request, the base units 12, 13 and 14 transfer the initialization request to the host computer 10. The host computer interrogates its database to determine, based upon the serial number contained in the initialization request, whether this remote device was previously accepted into the network. If the host computer determines that the remote device was previously accepted into the network, the computer assumes that the device requires re-initialization, and assigns one of the base units 12, 13 or 14 to the remote unit 15. The assigned base unit 12, 13 or 14 then transmits, using the universal chipping code, information packets containing re-initialization data. The remote unit 15 then receives and decodes the re-initialization data and stores the data in memory. The re-initialization data can include, for example, the network chipping code and an unit number which is to be assigned to the remote unit.

When the host computer 10 determines, based upon the serial number contained in the initialization request, that the remote device 15 has never been a member of the network, the initialization request is interpreted as a request for initialization, as compared to a request for re-initialization. Under this circumstance, there is no way for the host computer 10 to determine whether the remote device 15 is a new device to be added to the network, or whether it is a device residing on an is adjacent network, and therefore, should not be added to the network. The host computer 10 stores the serial number of the remote unit 15 in a location accessible to a system administrator. The administrator then determines which of the remote units 15 should be accepted into the network (i.e, initialized) and which remote devices 15 should not be accepted into the network. The administrators decisions are stored in the database of the host computer. Thereafter, when an subsequent initialization request is received from a remote unit 15, the unit is either ignored or initialized, depending upon the stored decision of the administrator.

A software option can be provided in the host computer 10 to bypass the administrator and to automatically initialize any remote unit 15 sending an initialization request. This software option is particularly useful where the network is not located in an overlapping relationship with another similar network. In this situation, it is assumed that all the remote units 15 requesting initialization should be added to the network.

Figure 4:
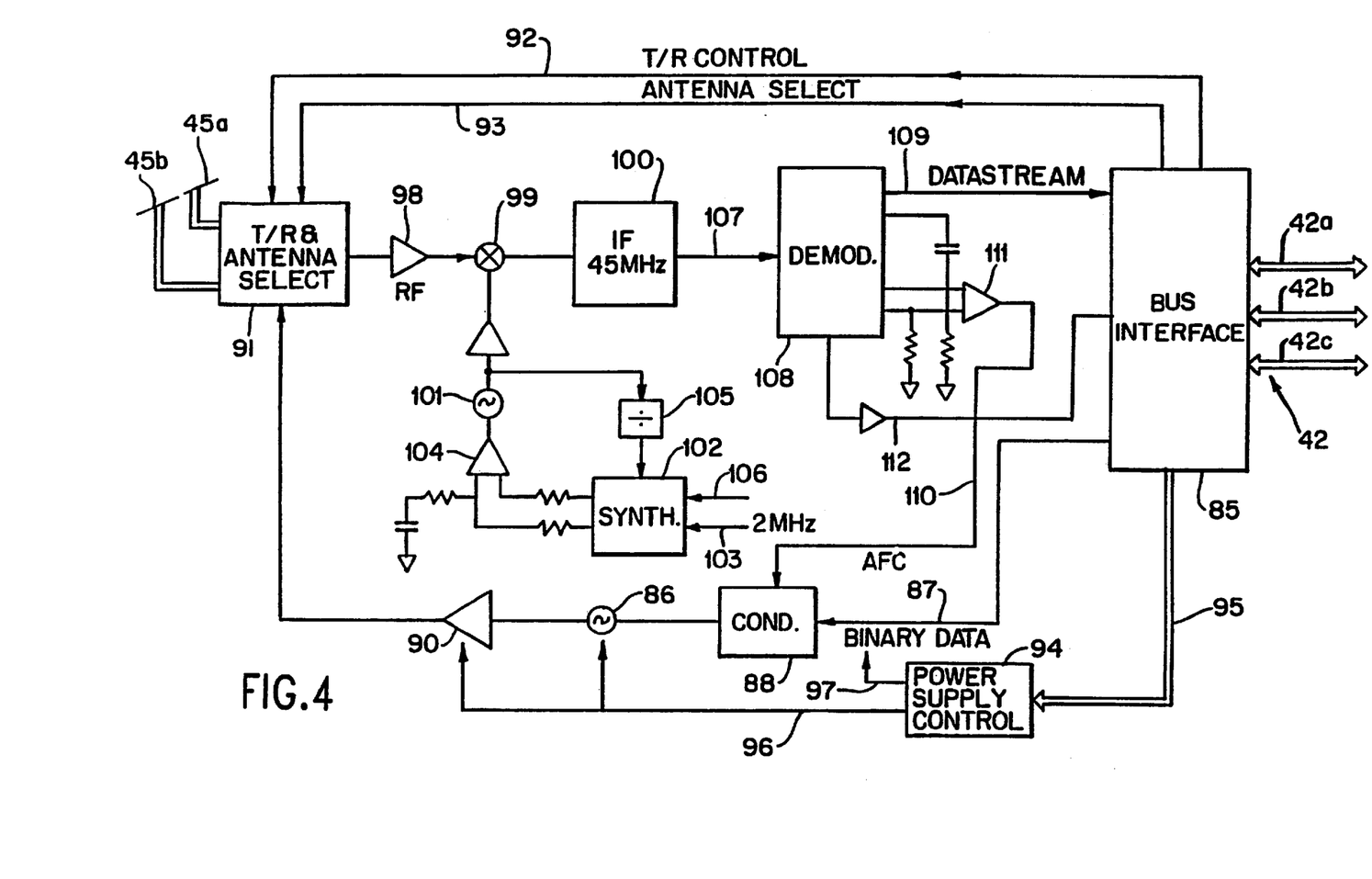
FIG. 4 is an electrical schematic diagram of the circuitry of the transceiver in the remote unit of FIGS. 1 and 3.

Referring to FIG. 4, the transceiver 44 in a remote unit 15 is shown in more detail. The transceiver 44 of FIG. 4 may be in large part the same as the transceiver 44 of FIG. 9 of U.S. Pat. No. 5,029,183, and reference thereto is made for details of the construction and operation of the transceiver 44. When a data packet is received, the data packet information is transferred from the transceiver 44 to the memory 41 of the remote unit 15. Processing of the data packet information stored in the memory 41 is effected by the CPU 40, which uses the universal chipping code and/or the network chipping code to decode the received data packet. When transmitting data packets, the CPU uses either the universal chipping code or the network chipping code to form the data packet in memory 41. The data packet is then transferred to the transceiver 44 which transmits the data packet to the base stations 12, 13 and 14. As can be appreciated, the basic hardware of the remote units 15 described in the U.S. Pat. No. 5,029,183, or a stationary computers or point of sale terminal having plug-in or integral communication circuitry as shown in the U.S. Pat. No. '5,029,183, can be used in the present invention provided the operation of the CPU is changed (i.e., software change) to selectively utilize the universal chipping code in addition to the network chipping code, for both decoding the received data packets and encoding the data packets to be transmitted.

Figure 5:
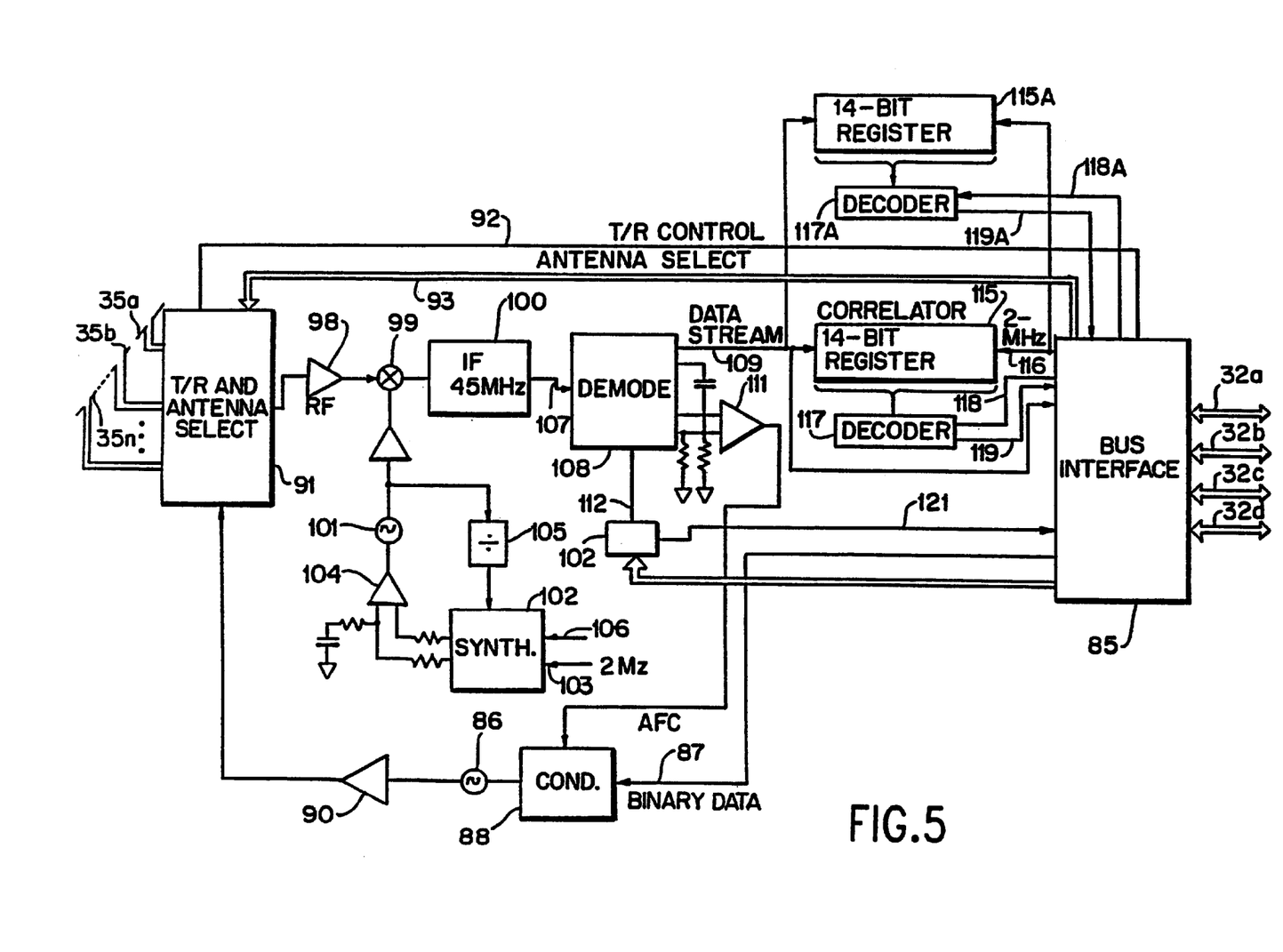
FIG. 5 is an electrical schematic diagram of the circuitry of the transceiver in a base station of the system of FIGS. 1 and 2.

Referring now to FIG. 5, the transceiver 34 is shown in more detail. This transceiver 34 shown in FIG. 5 may be in large part the same as the transceiver 34 of FIG. 10 of U.S. Pat. No. 5,029,183, with one major exception. The transceiver of FIG. 4 has an additional shift register 115A and an additional decoder 117A. Reference is made to the U.S. Pat. No. 5,029,183 for details of the construction and operation of the transceiver 34.

The serial data output from the demodulator 108 on line 109 is connected in parallel to dedicated 144-bit (i.e., 3×48-bit) shift registers 115 and 115A which are clocked at 2-MHz by clock input 116 from the CPU 30, to look for a 48-chip start symbol in real time. The content of this shift register 115 is decoded in real time, evaluated once every 2-MHz clock period, by a decoder 117 containing a value representing the network chipping code used in the exclusive-OR function in the remote unit 15 to encode the data. Similarly, the content of this shift register 115A is decoded in real time, evaluated once every 2-MHz clock period, by a decoder 117A containing a value representing the universal chipping code used in the exclusive-OR function in the remote unit 15 to encode the data. These code values may be changed in decoders 117 and 117A by loading a new binary number from the CPU 30 via interface 85 using the port bus 32b and input 118 and 118A, respectively. Alternatively, the code used in the either decoder 117 and/or decoder 117A may be fixed by using a PROM device for this network or for this particular base station.

When a valid 48-bit start signal is recognized in decoder 117 or 117A, using whatever level of confidence is selected (all the bits need not be valid), a start detection signal is produced on output 119 or 119A, respectively, to the interface 85, which is recognized by the CPU 30 to mean that a valid packet is incoming. The serial data on line 109 is then copied to memory 31 through the intermediary of loading serially to a register in the CPU 30 then the CPU executes move instructions to load to the memory 31. The CPU determines, based upon which output line 119 or 119A provided the start detection signal, which chipping sequence was used by the remote unit 15 to encode the received transmission. For example, if a remote unit 15 encodes and transmits a message using the universal chipping code, decoder 117A would generate a start detection signal on output 119A which is then received by the CPU 30. The CPU 30 then uses the universal chipping code to decode the remainder of the transmitted message which has been stored in memory. If a remote unit 15 encodes and transmits a message using the network chipping code, the decoder 117 generates a start detection signal on output line 119. Responsive to the start detection signal on output 119, the CPU 30 uses the network chipping code to decode the remainder of the transmitted message which has been stored in memory.

The two independent decoders 117 and 117A enable the base stations 12, 13 and 14 to receive data packets which have been encoded by the remote stations using either the universal or the network chipping code. The base stations 12, 13 and 14 respond to the received data packets by encoding the data packets to be transmitted to the remote units 15 using either the universal or the network chipping code. When transmitting data packets, the CPU uses either the universal chipping code or the network chipping code to form the data packet in memory 31. The data packet is then transferred to transceiver 34 which transmits the data packet to the remote units. As can be appreciated, the basic hardware of the transceiver 34 for transmission described in the U.S. Pat. No. 5,029,183 can be used in the present invention provided the operation of the CPU 30 is changed (i.e., software change) to selectively utilize the universal or network chipping code for forming the data packets to be transmitted to the remote units 15.

Figure 6A:
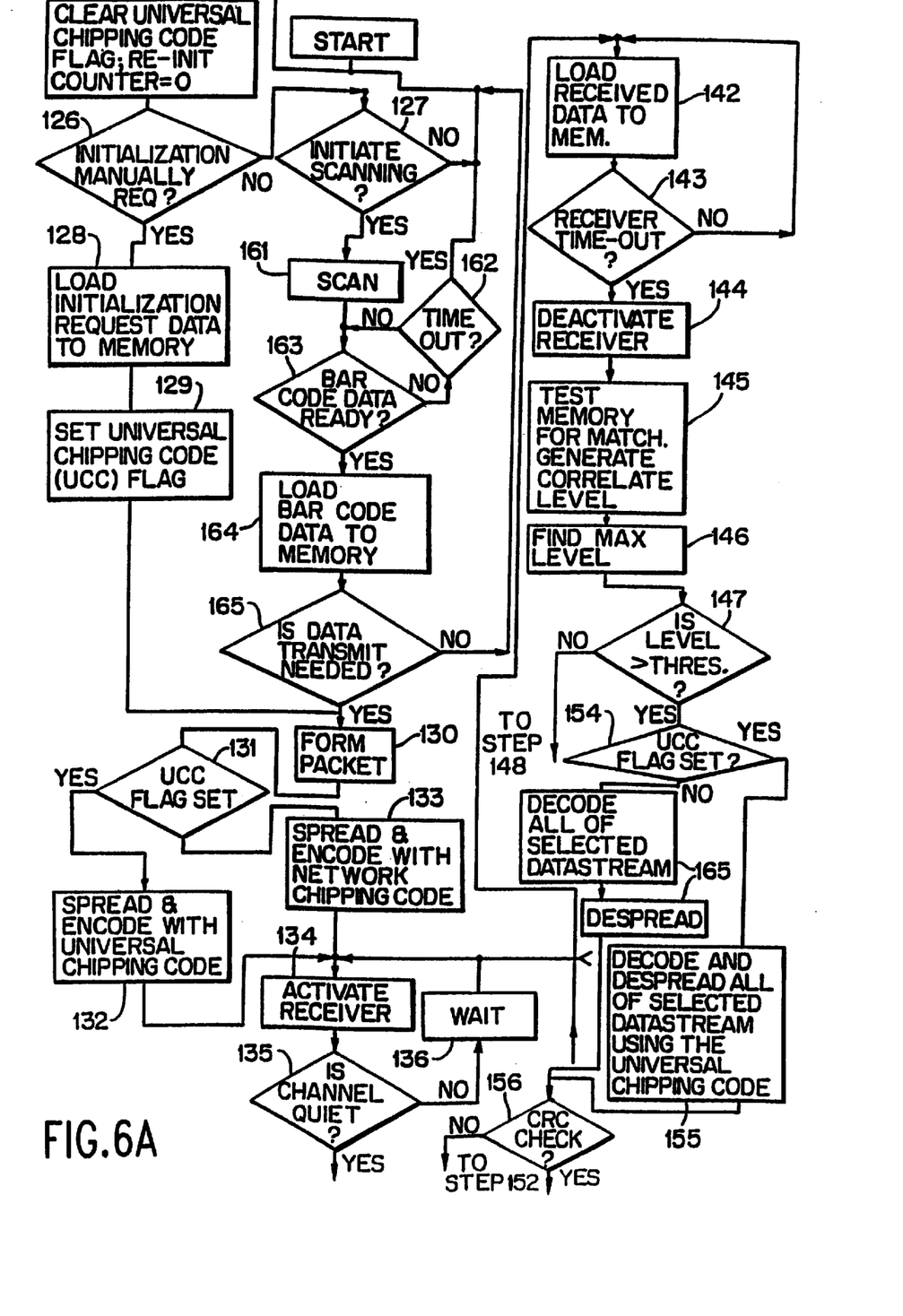
FIG. 6A–6C is a logic flow chart of an algorithm which may be executed by the CPU in a remote terminal unit of FIGS. 1 and 3 for a system according to one embodiment of the invention.
Figure 6B:
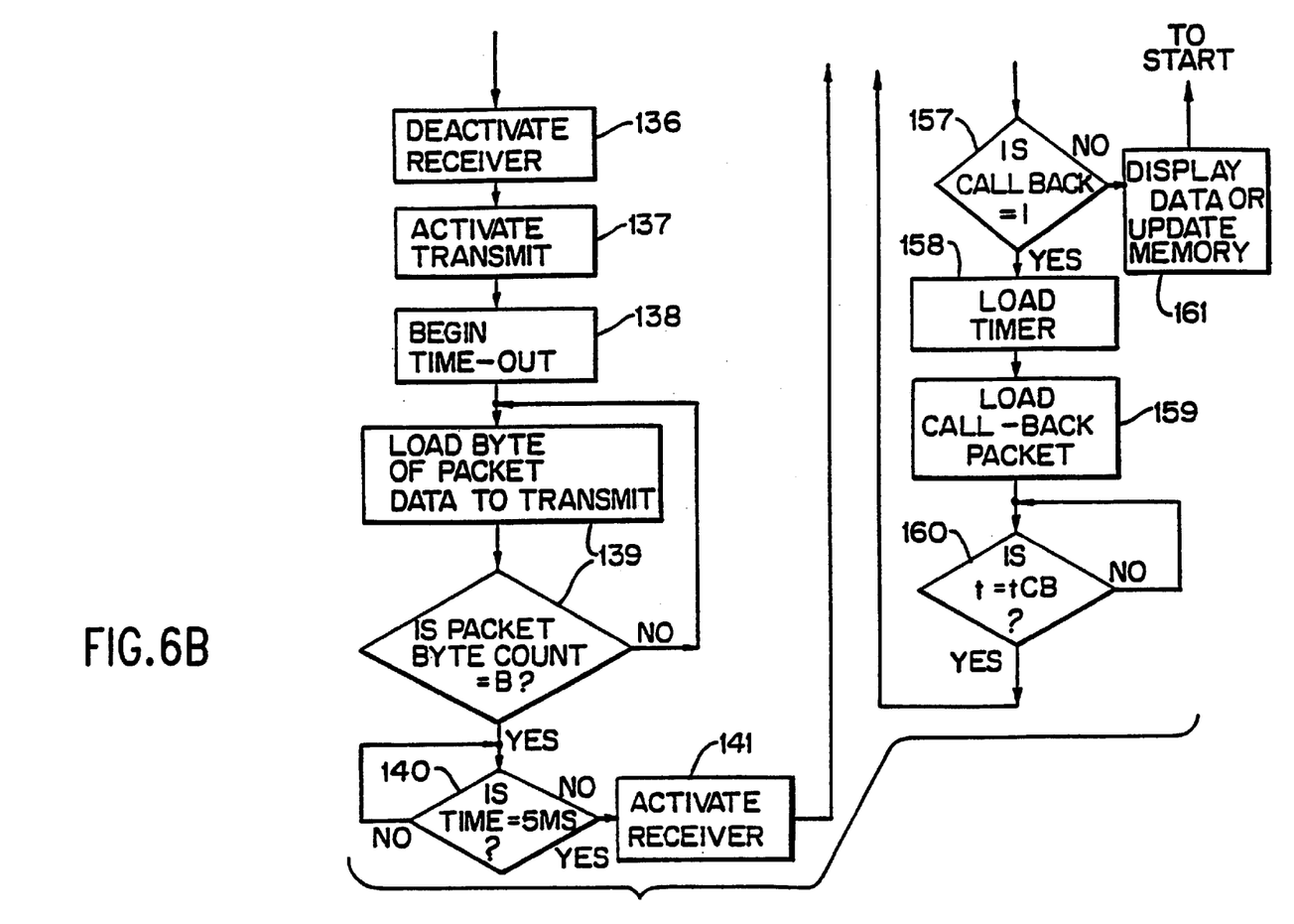
Figure 6C:
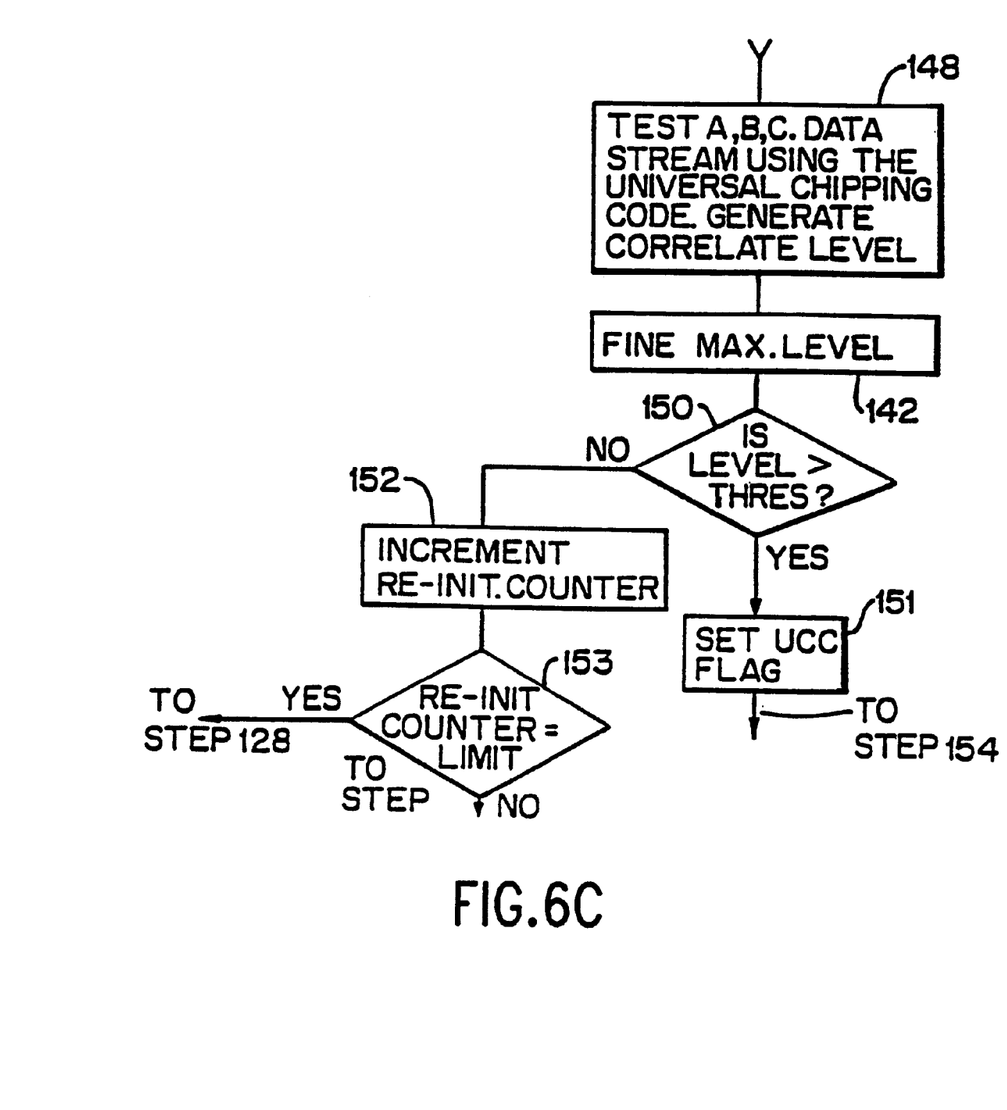

Referring to FIG. 6, a flow chart of one example of a type of program executed by the CPU 40 in the remote unit 15 is illustrated. For this example it is assumed that the laser-scan bar code reader 43 of FIG. 3 is being used as the data gathering device. The idle state of the program is a loop indicated by decision blocks 125, 126 and 127. Block 125 resets a universal chipping code flag and sets a re-initialization counter to zero. At block 126, a test is performed to determine whether an initialization of the remote unit 15 is being manually requested. The manual request for initialization can be, for example, a predetermined keypad entry sequence performed on the keypad 48 of the remote device. Assuming that a manual request for initialization is not found, at block 127 a test is made to see if the bar code reader 43 is initiated (for example, pulling a trigger (not shown)), and when "no" the program returns to block 125.

When it is determined at block 126 that a manual request for initialization has been entered at the keyboard 48, initialization data is loaded to data memory at block 128. The initialization data can be any message which is uniquely identifiable by the base units 12, 13 and 14 as an initialization request. At block 129, the universal chipping code (UCC) flag is set. At block 130, a routine is entered to make up a transmission packet by adding appropriate data (reference is made to FIG. 7, of the U.S. Pat. No. 5,029,183 for details of the transmission packet.) At block 131, if the UCC flag is set, progress is made to block 132 where the universal chipping code is used to spread and encode the transmission packet. The receiver is activated at point 134 by signalling the power supply 97 to apply supply voltage to the receive components via line 97 in FIG. 4. The CPU then queries the output 112 to see if the channel is quiet, indicated by decision point 135; if not, a wait loop 136 is entered to delay a selected time before retrying by going back into the activate receiver block 134. If the channel is quiet, the receiver is deactivated at block 136, and the transmitter circuitry is activated at the block 137, and at block 138 a time-out counter is started to define the time period of the transmission. Bytes of the transmission packet are loaded from the memory 41 to the transmitter by a loop routine 139 which counts the bytes until all bytes have been loaded. Block 140 determines when the time-out is reached. Accordingly, upon completion of step 140, the initialization request packet, which has been encoded using the universal chipping code, has been transmitted from the remote unit 15 to the base stations 12, 13 and 14, with the packet encoded At block 141 the receiver is activated, and then a loop 142 and 143 is entered to load all of the received data from the transmitter to the memory 41. When it is determined that the receiver has timed-out, the receiver is deactivated at block 144, and the CPU enters a routine 145 to test, using a portion of the network chipping code, the received data stored in memory to generate a correlate-level indicating the degree to which there is correlation with the expected start-symbol decode for a valid packet. The highest correlate-level found is selected at block 146, and tested at decision point 147 against the threshold established for assuming a good packet (e.g., 41-of-48). If this test fails, then it is assumed that there was not received an acknowledge packet which has been encoded with the network chipping code. The test at point 147 should normally fail when this test occurs shortly after an initialization request, encoded with the universal chipping code, is transmitted at step 139. After the test at point 147 fails, the CPU enters a routine 148 to test, using a portion of the universal chipping code, the received data stored in memory to generate a correlate-level indicating the degree to which there is correlation with the expected start-symbol decode for a valid packet. The highest correlate-level found is selected at block 149, and tested at decision point 150 against the threshold established for assuming a good packet (e.g., 41-of-48). If this test fails, then it is assumed that there was not received an acknowledge packet which has been encoded with the universal chipping code. Assuming the test passes, the UCC flag is set at block 150 and progress is made to block 154 where it is tested whether the UCC flag is set. If the UCC flag is set, the CPU enter decodes and despreads the received datastream using the universal chipping code at block 155, and performs CRC check at point 156. If the CRC passed, the CPU enters a routine 157 to see if a call-back request is included in the data in the received packet, and if so, then a timer is loaded at point 158 to begin counting down the period requested by the base station in the acknowledge packet. A standard call-back message, containing no data field but merely functioning to allow the base to send data to this remote unit, is formed at block 159. A loop 160 is entered to wait for timeout of the period set in block 158, and when reached the transmit function enter by making progress to block 131. If no call-back request was present, the data which has been received in response to the initialization request is stored in memory, thereby providing initialization data to the remote unit 15. The initialization data received includes the network chipping code for the network.

The operation of the remote unit 15 after it has been initialized is now described. The remote unit 15 has the network chipping code stored in memory which can be used to communicate with the base units 12, 13 and 14. The idle state is indicated by blocks 125, 126 and 127. In block 125 the UCC code is cleared. At block 127, a test is made to determine whether the scanning is initiated (i.e., pulling a trigger of a handheld scanner), and when "yes" the scan is initiated by activating the laser source 58 and the scan motor 60, indicated by the block 161. The CPU 40 then enters a loop 163 to wait for bar code data from the device 43; if no valid bar code data is detected by the end of a time-out period indicated by decision point 162, then control is returned to the start loop 125. If bar code data is detected, then block 164 is entered to load the bar code data to the memory 41 and check its validity using whatever criteria is appropriate for the specific use. Next, the decision point 165 determines whether or not a packet transmission is needed, and if so a routine 130 is entered to make up the data packet to be transmitted. At point 131 it is determined that the UCC flag is not set, and routine 133 is then used to spread and encode the packet using the network chipping code which was stored in memory when the remote unit was initialized. At steps 134 through 147 the data packet is transmitted to the base stations, and a data packet subsequently received from one of the base stations is checked to determine whether the correlation level reaches a predetermined threshold. If yes, the UCC flag is checked at block 154 where it will be found to be not set, and progress is made to block 165 where the CPU utilizes the network chipping code stored in memory to decode and despread the received data. A CRC check is performed at block 156 and when the CRC passes, at block 157 a check is made to determine whether the received data packet requested a call back. If no call-back requested, the CPU takes whatever action dictated by the data, ordinarily including displaying received data at block 161, and then re-enters the start loop 127. If a call-back is requested at block 157, progress is made to blocks 158 through 160, where call-back packet is appropriately prepared and then transmitted at the routine starting and block 131.

If the network changes the network chipping code, or the remote unit loses memory of the network chipping code, the remote unit will no longer be able to communicate with the base stations using the network chipping code stored in its memory. The remote unit 15 must send a request for re-initialization to the base station utilizing the universal chipping code. The flow of determining when a re-initialization is to be transmitted is describe with reference to FIG. 6. At block 133, the data packet to be transmitted to the base stations is spread and encoded utilizing the network chipping code stored in the remote units 15 memory. However, the network chipping code is now erroneous, and therefore the base station does not respond thereto. At blocks 145 through 147, since no response is provided by the base station, at block 147, the correlation level for the start-symbol will not reach the threshold required, and progress will be made to block 148. At block 148 the CPU enters a routine 148 to test, using a portion of the universal chipping code, the received data stored in memory to generate a correlate-level indicating the degree to which there is correlation with the expected start-symbol decode for a valid packet. The highest correlate-level found is selected at block 149, and tested at decision point 150 against the threshold established for assuming a good packet (e.g., 41-of-48). The test at block 150 will fail at this point since the transmissions from remote units 15 are not encoded with the universal code. At block 152 a re-initialization counter is incremented, and at block 153, if it is determined that the re-initialization counter is at a predetermined limit, progress is made to the block 128 which initiates the routine for requesting an initialization utilizing the universal chipping code. If at block 153 the re-initialization counter does not equal the predetermined limit, progress is made to block 134. This re-initialization counter permits the remote unit 15 to attempt to communicate with the base a multiple number of times, using the network chipping code stored in memory, prior to requesting an initialization. It should be noted that the same request for initialization is sent (block 128) regardless of whether the initialization is manually requested at block 126, or is a re-initialization requirement determined at block 153.

Figure 7:
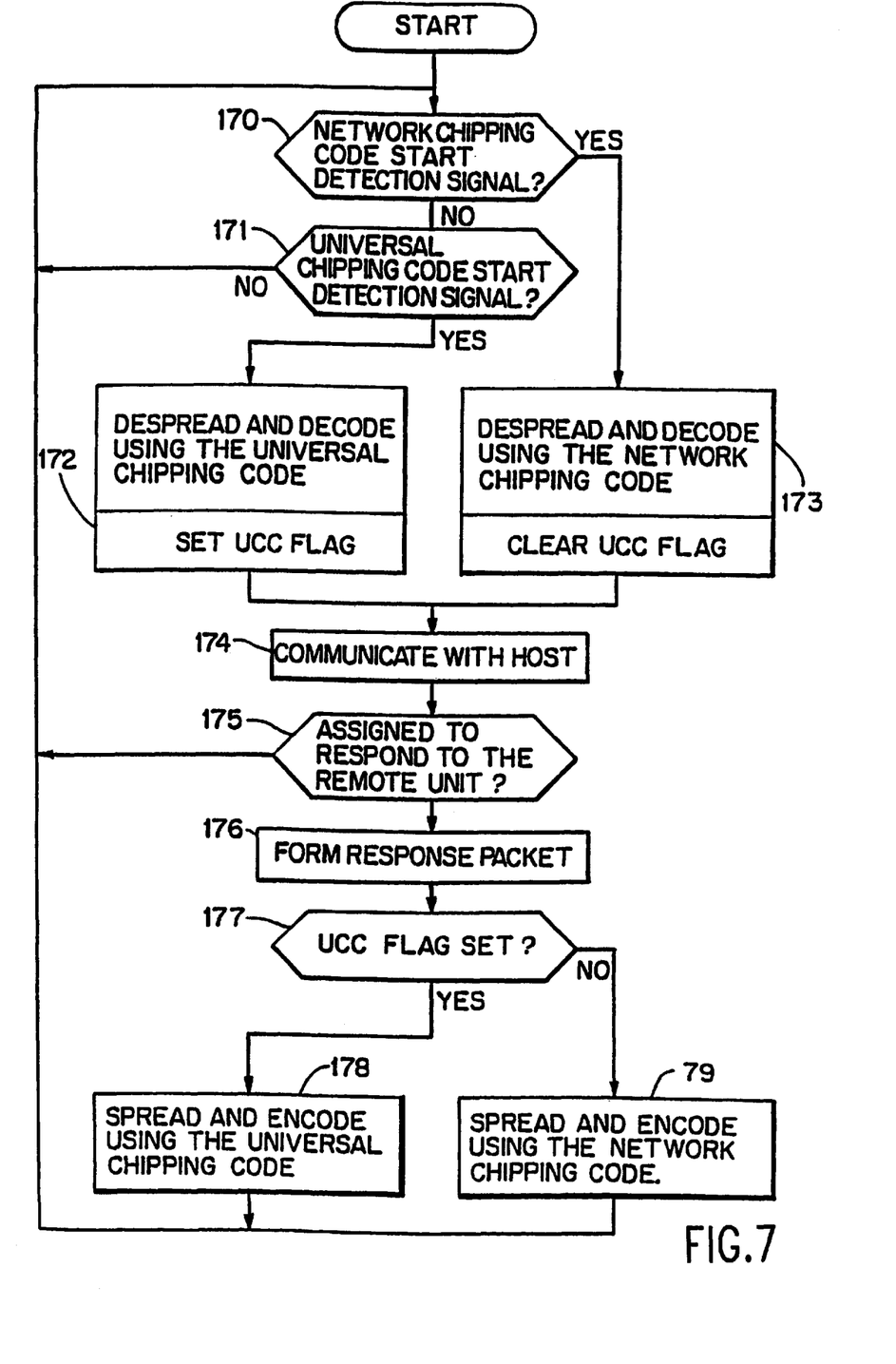
FIG. 7 is a logic flow chart of an algorithm which may be executed by the CPU in a base station of FIGS. 1 and 2 for a system according to one embodiment of the invention.

Referring to FIG. 7, a flow chart of one example of a type of program executed by the CPU 30 in the base units 12, 13 and 14 is illustrated. The idle state for the program is indicated by both block 170 and block 171 failing to detect a start-symbol utilizing the network chipping code and the universal chipping code, respectively. Block 170 monitors the start detection line 119 which becomes active when the decoder 117, which utilizes at least a portion of the network chipping code, detects a start-symbol. If a start-symbol is detected, at block 173 the remaining data stream is stored in memory and is despread and decoded using the network chipping code and a universal chipping code flag is cleared. If at block 170 the start detection line is not active, progress is made to block 171 which monitors the start detection line 119A which becomes active when the decoder 117A, which utilizes at least a portion of the universal chipping code, detects a start-symbol. If a start-symbol is detected, at block 172 the remaining data stream is stored in memory and is despread and decoded using the universal chipping code and a universal chipping code flag is set. A routine at block 174 communicates via connection 11, the received data to the host computer 10 which determines, based upon the serial number contained in the received data, which of the base stations 12, 13 or 14 is assigned to this particular remote unit 15. Further, the host computer 10 communicates to the base stations 12, 13 and 14 data to be transmitted back to the remote unit 15. In the case where the data packet received from the remote unit 15 is a request for initialization, the host computer 10 communicates to the base stations 12, 13 and 14 update information such as, for example, the network chipping code, a unit number to be assigned to the remote unit, and the RF frequency channel to be utilized. At block 175 the CPU determines, based upon the communication received from the host computer 10, whether it is assigned to respond to the remote unit 15. If No, the program returns to the idle state of the program starting at block 170. If Yes, at block 176 a data packet to be transmitted is formed using the data received from the host computer 10 and the appropriate headers, fillers, trailers, and CRC information. At test 177, if the UCC flag is set, the data packet formed at block 176 is spread and encoded using the universal chipping code. If the UCC flag is not set, the data packet formed at block 176 is spread and encoded as a function of the network chipping code.

While the remote unit of FIG. 4, and the flowchart of FIG. 6 describes a remote unit in which the decoding and despreading is performed in software. However, it is understood that hardware can be used to achieve the same overall function. For example, a hardware correlator can be provided in the remote unit of FIG. 4 to despread the received data and a hardware indication provided to indicate whether the received data was encoded using the network chipping code or the universal chipping code. In such a case, step 129 of FIG. 6 is modified to include setting the correlator to decode the universal chipping code and step 127 is modified to include setting the correlator to decode the network chipping code. Still further, step 145 is modified to check the hardware indication to determine which chipping code was received and step 148 through step 154 are deleted.

While in FIG. 5, the transceiver 34 in the base unit is shown as having a 144 bit correlator, it is understand that the number of bits in the correlator can be increased or decreased.

Finally, a system, as described herein, having two distinct chipping codes (i.e., providing two communications channels) can be used when changing the network chipping sequence that a given system is operating on. By temporarily using the universal chipping channel during the transition, the system can remain fully functional during the time period that the transfer is occurring. For example, during the transfer period, the universal chipping channel is temporarily changed to decode the existing network chipping code and the network chipping channel is changed to decode the new network chipping code. After a period of time which would allow for all remote units to be heard from, the universal channel will be returned to decoding the universal chipping code. In this way, a remote unit which for any reason missed the sequence change would be automatically brought back into the network via the reinitialization mechanism described above.

While the invention has been described with reference to specific embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A remote unit having a bar code reader for reading a bar code label and a spread spectrum RF radio link for communicating with a base station by exchanging data packets encoded with a network chipping code, said remote unit comprising:

a) means for storing the network chipping code;

b) means for forming an initialization request;

c) means for encoding said initialization request using a universal chipping code;

d) means for transmitting said encoded initialization request to the base station;

e) means for receiving from the base station a spread spectrum RF encoded initialization data packet which is encoded by the universal chipping code;

f) decoding means for decoding said received encoded initialization data packet using said universal chipping code;

g) means for updating said network chipping code stored in said means for storing the network chipping code responsive to decoded initialization data packets;

h) scanning means for scanning a bar code label containing an item of information; and i) means for transmitting to the base station said item of information using the network chipping code.

2. A spread spectrum RF data communications system comprising:

a) a plurality of remote units, with each one of said plurality of remote units comprising:
  i) remote unit transmitting means for transmitting via a spread spectrum RF link one of two signals, said first one of two signals being a data packet encoded in the alternative with a network chipping code and a universal chipping code, and said second one of two signals being an initialization request packet encoded with the universal chipping code;
  ii) remote unit receiving means for receiving via the spread spectrum RF link, a base station data packet encoded in the alternative with a network chipping code and a universal chipping code;
  iii) remote unit detecting means for detecting whether the received base station data packet is encoded with said network chipping code or said universal chipping code; and
  iv) remote unit decoding means for decoding said received base station data packet; and b) at least one base station comprising:
  i) receiving means for receiving said one of two signals transmitted by said remote units;
  ii) detecting means for detecting whether the received signal is encoded with said network chipping code or said universal chipping code;
  iii) decoding means for decoding said received signal;
  iv) means for encoding the base station data packet using said network chipping code or said universal chipping code depending upon the result of the detecting means; and
  v) means for transmitting via the spread spectrum RF link the base station data packet to said remote units.

3. A method of setting a remote unite having a bar code reader for reading a bar code label and a spread spectrum RF radio link for communication with a base station by transmitting a plurality of data packets which are encoded in accordance with a network chipping code, the method comprising the steps of:

a) transmitting an initialization request data packet encoded by a universal chipping code from said remote unit to said base station via the spread spectrum RF link, said universal chipping code being different than said network chipping code;

b) receiving at said remote unit an initialization data packet transmitted by said base station;

c) scanning the bar code label containing an item of information with the bar code reader;

d) transmitting to the base station said item of information using the network chipping code.

* * * * *